US005768136A

United States Patent [19]
Fujiwara et al.

[11] Patent Number: 5,768,136
[45] Date of Patent: Jun. 16, 1998

[54] METHOD AND APPARATUS FOR DECIDING TRACE OF TOOL TO BE MOVED

[75] Inventors: Ryujin Fujiwara, Kawasaki; Hitoshi Yoshihara, Mitsukaido; Koji Aoyama, Tsuchiura, all of Japan

[73] Assignee: Canon Kabushiki Kaisha, Tokyo, Japan

[21] Appl. No.: 629,755

[22] Filed: Apr. 9, 1996

[51] Int. Cl.$^6$ .................. G06F 19/00; G05B 19/4097
[52] U.S. Cl. .................. 364/474.24; 364/474.26; 364/474.33; 364/474.34; 364/468.04
[58] Field of Search .................. 364/468.01, 468.03, 364/468.04, 474.05, 474.22–474.27, 474.29, 474.33, 474.34, 191–193; 395/119, 120, 964; 345/419, 420, 964

[56] References Cited

U.S. PATENT DOCUMENTS

| | | | |
|---|---|---|---|
| 4,837,703 | 6/1989 | Kakazu et al. | 364/474.18 |
| 4,868,761 | 9/1989 | Hayashi | 364/474.26 X |
| 4,907,164 | 3/1990 | Guyder | 364/474.24 X |
| 5,043,906 | 8/1991 | Jepson | 364/474.24 X |
| 5,095,440 | 3/1992 | Suzuki et al. | 364/474.33 |
| 5,177,689 | 1/1993 | Kinasi et al. | 364/474.26 |
| 5,189,626 | 2/1993 | Colburn | 364/474.24 |
| 5,351,196 | 9/1994 | Sowar et al. | 364/474.24 |

FOREIGN PATENT DOCUMENTS

| | | |
|---|---|---|
| 0 604 660 | 7/1994 | European Pat. Off. . |
| 6-266427 | 9/1994 | Japan . |
| 1 497 562 | 1/1978 | United Kingdom . |
| WO 93/19129 | 9/1993 | WIPO . |

*Primary Examiner*—Joseph Ruggiero
*Attorney, Agent, or Firm*—Fitzpatrick, Cella, Harper & Scinto

[57] ABSTRACT

A method and apparatus is provided for automating an operation to determine a trace of a tool to be moved, which is used for processing a reference surface of a solid such as an electrode or the like in a numerical controlled discharge machine tool. An origin position is set on the basis of figure information including an origin position mark, which was read from an electrode drawing, a reference surface position is recognized, a processing range is set on the basis of the set origin position and figure information, the number of times of cutting with the tool is calculated on the basis of information regarding the process including the processing range and a cutting amount of the tool, and after that, the trace of the tool to be moved is determined on the basis of the information obtained so far. Since the reference surface position is automatically recognized, it is unnecessary for a human to form a drawing of the reference surface for the electrode drawing. Thus, the operation to determine the trace of the tool to be moved can be automated.

16 Claims, 7 Drawing Sheets

METHOD AND APPARATUS FOR DECIDING TRACE OF TOOL TO BE MOVED

BACKGROUND OF THE INVENTION

1. Field of the Invention

The present invention relates to method and apparatus for selecting a trace of a tool to be moved, which is used for processing a reference surface of a solid.

2. Related Background Art

Hitherto, in a numerical controlled discharge machine tool, when a reference surface of a solid such as an electrode is processed, a trace of a tool to be moved has been selected by a procedure as mentioned below. First, a diagram of the reference surface formed by a human is inputted for a drawing (CAD drawing) of the solid formed by a CAD (Computer Aided Design), a sample of the trace of the tool to be moved is derived, and after that, the derived sample of the trace of the tool to be moved is interactively modified, thereby determining the trace.

Since the conventional method of determining the trace of the tool to be moved as mentioned above, largely depends on the human input, it takes a long time and many exertions and the quality of the trace of the tool to be moved depends on the capability of the person involved, which varies with each person.

SUMMARY OF THE INVENTION

The invention is made in consideration of the above problems and an object of the invention is to provide a method and apparatus in which a determination of a trace of a tool to be moved, used for processing a reference surface of a solid, is automated.

According to the invention, the above object is achieved by an apparatus comprising:

reading means for reading figure information from a drawing of a solid;

origin position setting means for setting an origin position on the basis of the figure information read by the reading means;

recognizing means for recognizing a position of a reference surface of the solid;

processing range setting means for setting a processing range on the basis of the origin position set by the origin position setting means, the figure information, and the position of the reference surface recognized by the recognizing means; and trace determining means for determining a trace of a tool to be moved on the basis of the processing range set by the processing range setting means and information regarding the process.

According to the invention, the above object is accomplished by a method comprising:

a reading step of reading figure information from a drawing of a solid;

an origin position setting step of setting an origin position on the basis of the figure information read in the reading step;

a recognizing step of recognizing a position of a reference surface of the solid;

a processing range setting step of setting a processing range on the basis of the origin position set in the origin position setting step, the figure information, and the position of the reference surface recognized in the recognizing step; and a trace determining step of determining a trace of a tool to be moved on the basis of the processing range set in the processing range setting step and information regarding the process.

DETAILED DESCRIPTION OF THE PREFERRED EMBODIMENTS

An embodiment of the invention will be described in detail hereinbelow with reference to the drawings.

Figure 1:
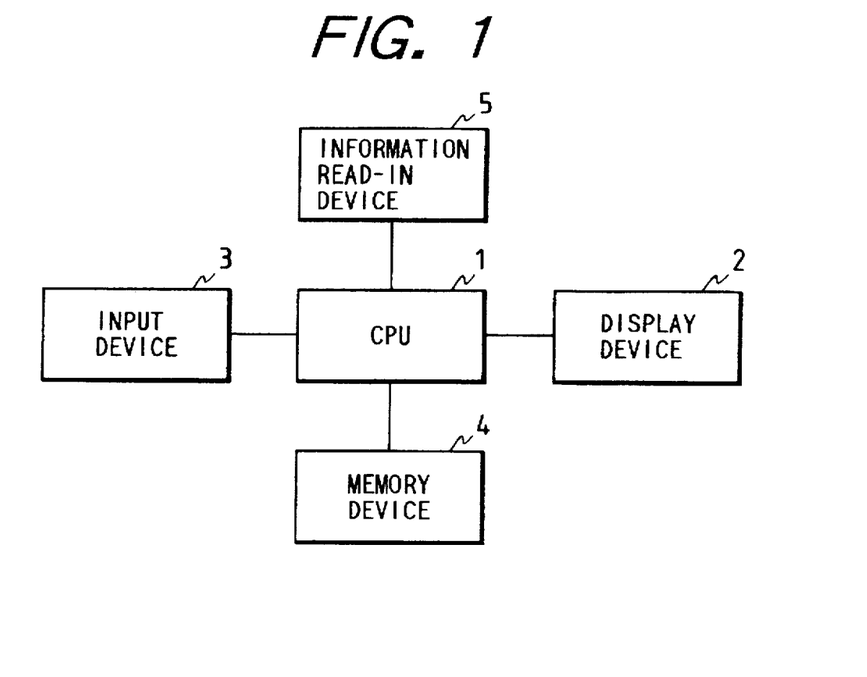
FIG. 1 is a block diagram showing an embodiment of the invention.

FIG. 1 is a block diagram showing an embodiment of an apparatus for determining a trace of a tool to be moved.

The apparatus according to the embodiment has a central processing unit (CPU) 1 for controlling the whole apparatus. The CPU 1 is connected to: a display device 2 for displaying various information such as an error, a warning, and a message, and the like; an input device 3 such as a keyboard or the like; a memory device 4 such as a semiconductor RAM, a magnetic disk, or the like; and an information read-in device 5 for reading a program from an external memory medium, such as a magnetic tape, a floppy disk, or the like.

The CPU 1 fetches a program from an external memory medium through the information read-in device 5 into the memory device 4 and executes a process for determining a trace of a tool to be moved in accordance with the program. That is, the CPU 1 reads figure information including an origin symbol (origin position mark of a drawing) from a 2.5-dimensional electrode drawing (CAD drawing) formed by a CAD, sets an origin position on the basis of the figure information, recognizes a reference surface position, sets a processing range on the basis of the set origin position and figure information, calculates the number of times of cutting on the basis of information regarding the process including the processing range and a cutting amount of the tool, and determines the trace of the tool to be moved on the basis of the obtained information. The data of the determined trace of the tool to be moved is stored into the memory device 4.

The drawing formed by the CAD is generally 2.5-dimensional. The 2.5-dimensional world will now be described hereinbelow.

It denotes a description of 3-dimensional characteristics of the surface of an object which can be observed from a camera. Information regarding a 3-dimensional target world which can be extracted from one image is limited to the information regarding the object surface which can be seen from the camera, and perfect 3-dimensional information including the back side of the object cannot be obtained, so that it is called a 2.5-dimensional world. A distance image and a normal line map are representative examples of this world. In a computer vision, the description of the 2.5-dimensional world is obtained by using brightness in a 2-dimensional image, a change in texture, and a shape of a region, and is collated with a 3-dimensional model of the object, thereby recognizing the object. In order to collate the description of the 2.5-dimensional world with a 3-dimensional model, it is necessary to decide on the direction of a line of sight of the camera.

Figure 2:
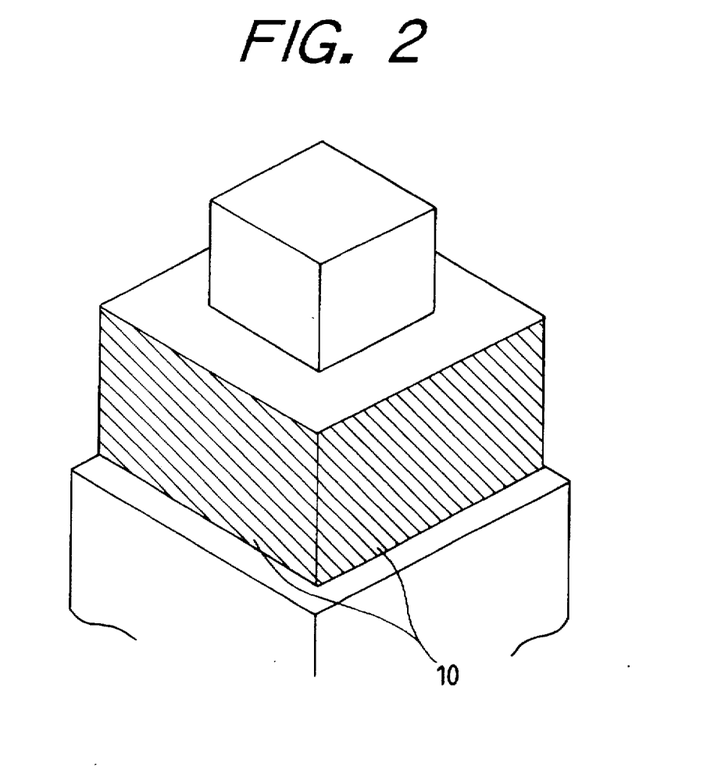
FIG. 2 is a perspective view showing a finished shape of an electrode.
Figure 10:
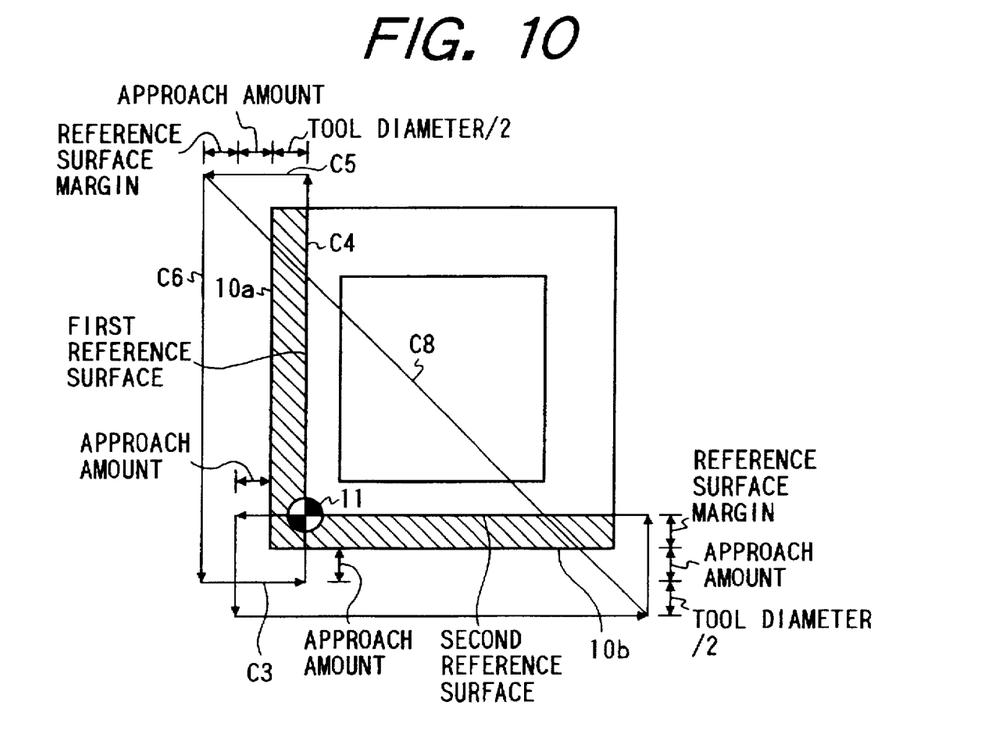
FIG. 10 is a diagram showing a state of an automatic calculation of the trace of the tool in the width direction when a whole reference surface is processed.
Figure 11:
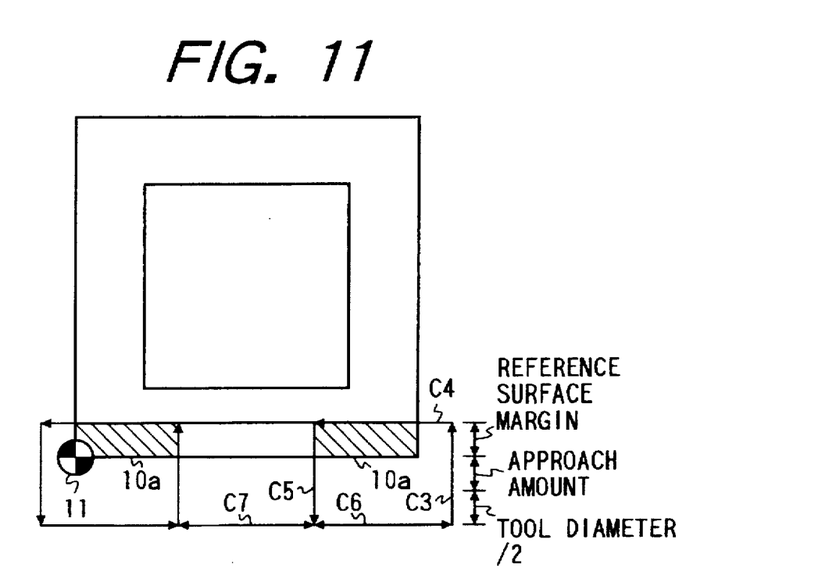
FIG. 11 is a diagram showing a state of the automatic calculation of the trace of the tool in the width direction when both ends of the reference surface are processed.
Figure 12:
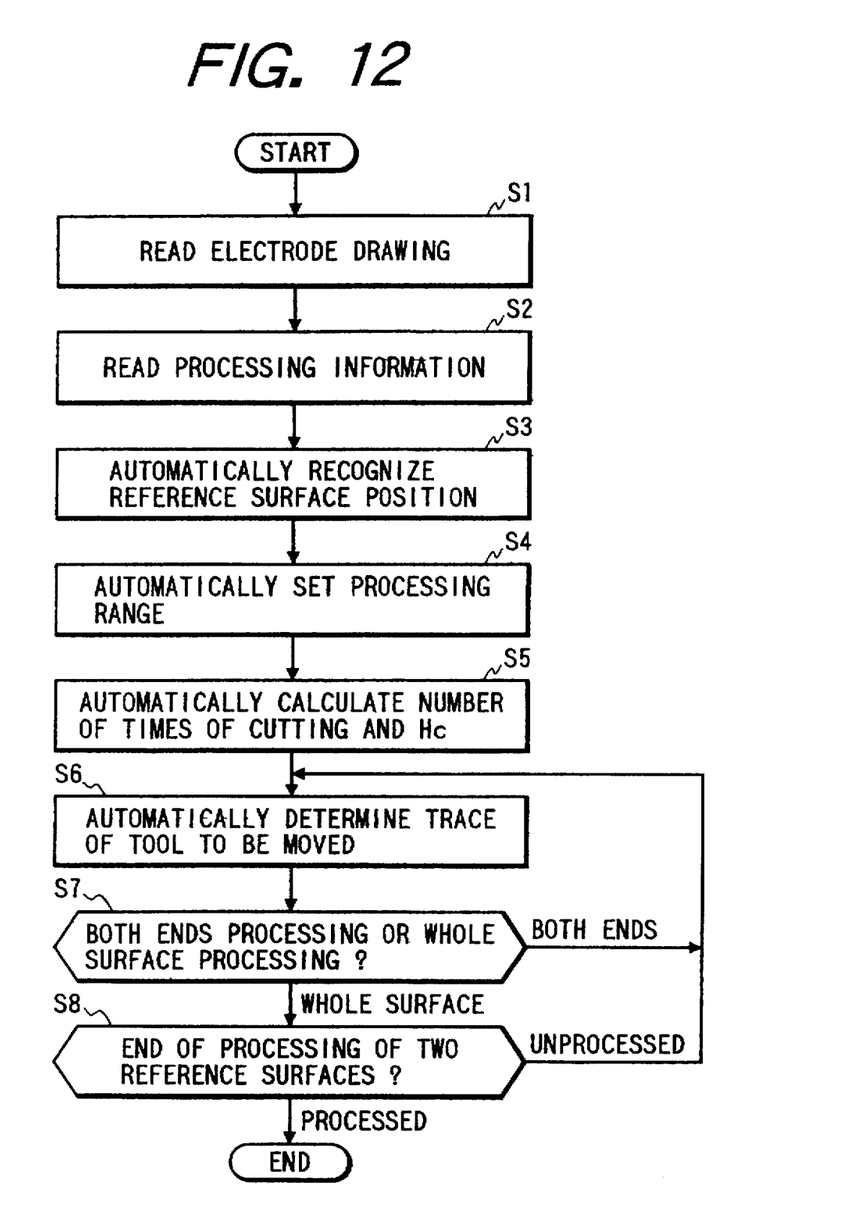
FIG. 12 is a flowchart showing the operation of an apparatus according to an embodiment of the invention.

The operation of the embodiment will now be described with reference to a flowchart of FIG. 12 together with FIGS. 2 to 11. FIG. 2 is a perspective view showing a finished shape of an electrode. In the diagram, a hatched surface is a reference surface 10 serving as a reference for positioning between a work as a target of a discharging process and an electrode in case of performing a discharging process.

Figure 3:
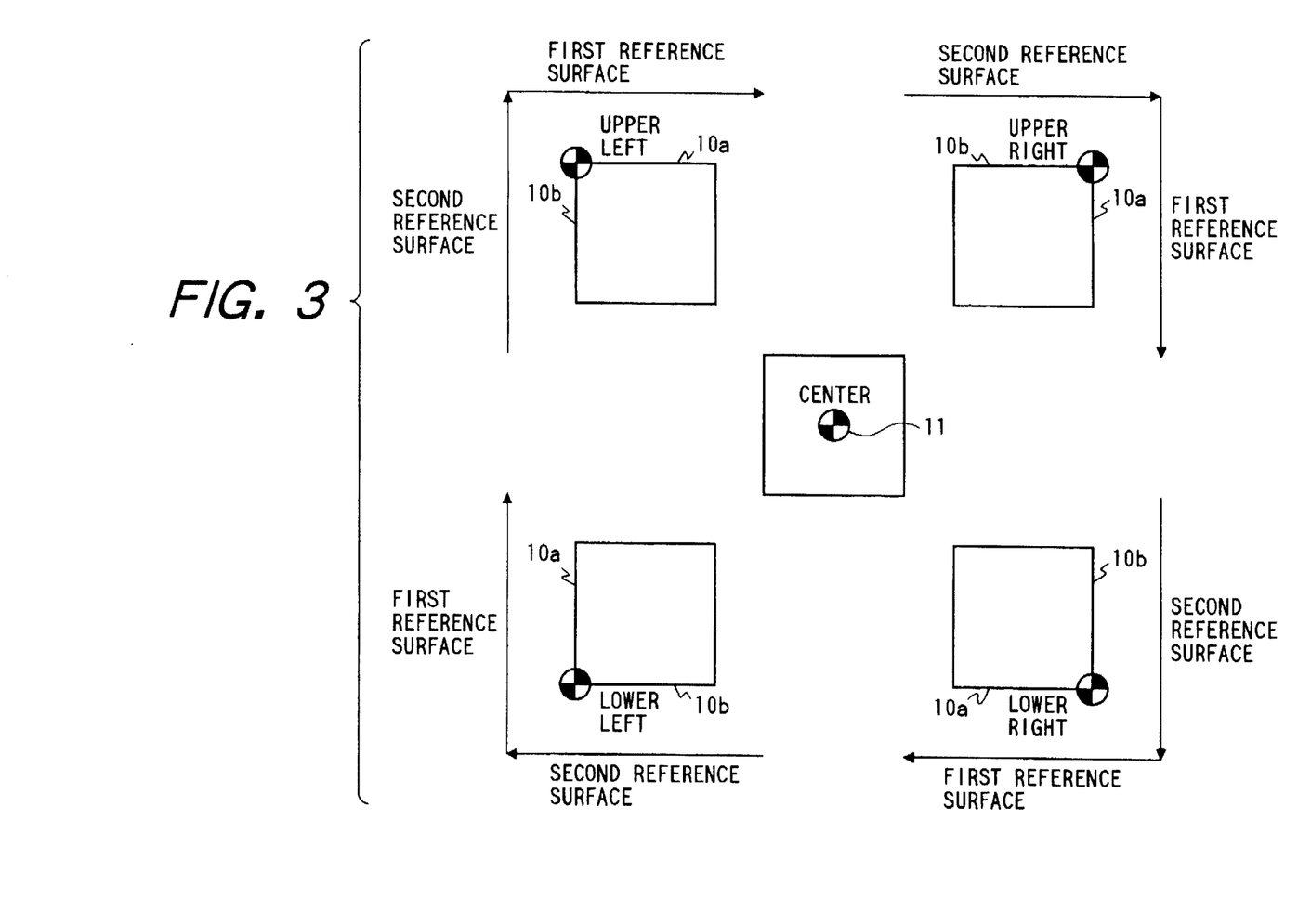
FIG. 3 is a diagram showing a CAD drawing of an electrode.

The CPU 1 reads a 2.5-dimensional electrode drawing formed by the CAD as shown in FIG. 3 (step S1).

In the step of reading the electrode drawing (step S1), the CPU 1 reads figure information including an origin symbol 11 from the electrode drawing and executes a recognizing process of a finished shape of the electrode as a target to be processed. The figure information to be read is geometric information such as straight line segment, an arc segment, and the like, geometric information regarding shapes of surfaces, origin position of the drawing expressed by the an origin symbol 11, and the like.

The CPU 1 sequentially reads a parameter file (processing information) in which information regarding a processing tool including a cutting amount of the tool and information regarding the electrode including the depth of the reference surface are described from the memory device 4 (step S2).

The CPU 1 automatically recognizes the position of the reference surface 10 (step S3).

The step (step S3) of automatically recognizing the position of the reference surface 10 will be described in detail hereinbelow.

Figure 4:
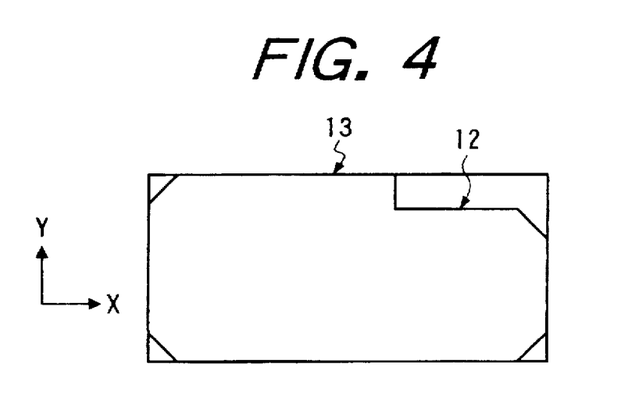
FIG. 4 is a diagram showing the relation between the outermost periphery of an electrode drawing and a boundary rectangle.

First, as shown in FIG. 4, there is considered a boundary rectangle 13 constructed by sides which are parallel with an X-axis and a Y-axis for a FIG. 12 of the outermost periphery of the electrode drawing.

Figure 5:
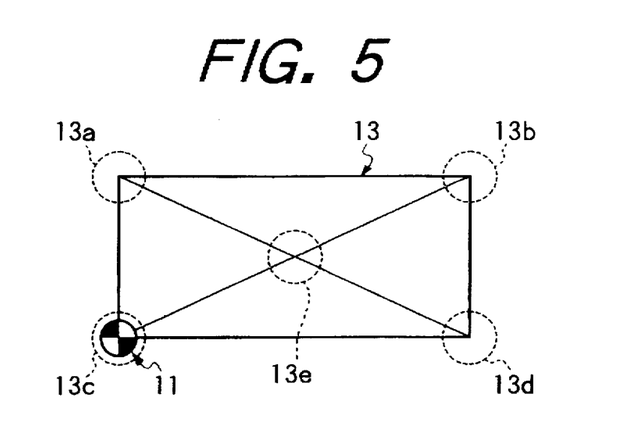
FIG. 5 is a diagram showing a state in which a position of an origin symbol in the boundary rectangle is judged and its attribute is set.

As shown in FIG. 5, it is judged that the origin symbol 11 at the origin position which was read in the reading step (step S1) of the electrode drawing is located near one of four vertexes 13a to 13d of the boundary rectangle 13 and a crossing point 13e of diagonal lines, thereby setting the attributes of the upper left 13a, upper right 13b, lower left 13c, lower right 13d, and center 13e.

Subsequently, from the relations between the attribute of the origin position shown in FIG. 3 and the positions of a first reference surface 10a and a second reference surface 10b, the positions of the first and second reference surfaces 10a and 10b of the electrode drawing, which was read, are recognized. When the attribute of the origin position is the center, the electrode has no reference surface 10.

After finishing the step (step S3), the CPU 1 automatically sets a processing range (step S4).

The step (step S4) of automatically setting the processing range will now be described in detail hereinbelow.

The processing range will now be considered by dividing it into a processing range $R_W$ in the width direction of the reference surface 10 and a processing range $R_h$ in the height direction of the reference surface 10.

Figure 6:
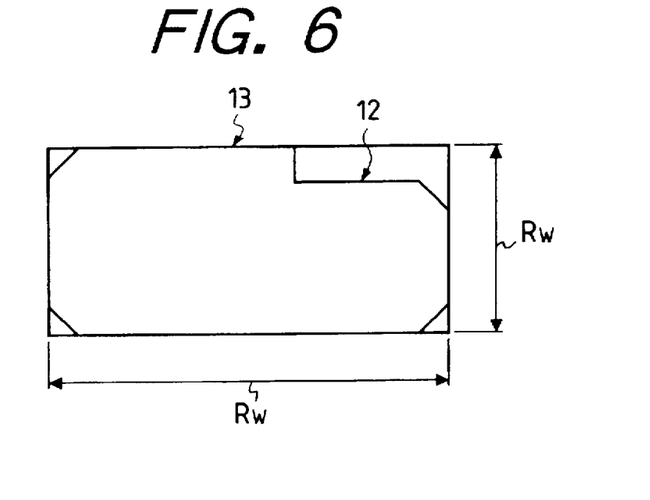
FIG. 6 is a diagram showing a processing range in the width direction.

With respect to the processing range $R_W$ in the width direction of the reference surface 10, as shown in FIG. 6, the lengths of the sides of the boundary rectangle 13, which was considered in the automatic recognizing step (step S3), at the position of the reference surface 10 are set to the processing range $R_W$ in the width direction of the first and second reference surfaces 10a and 10b, respectively.

Figure 7:
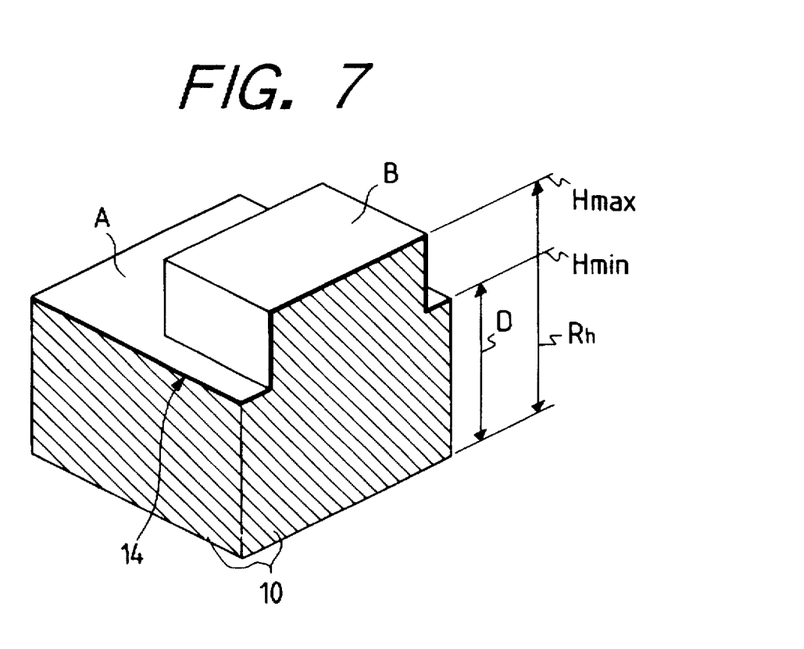
FIG. 7 is a diagram showing a processing range in the height direction.

The processing range $R_h$ in the height direction of the reference surface 10 will be obtained as follows. First, the reference surface 10 and a crossing line 14 of surfaces (A) and (B) adjacent to the reference surface 10 are obtained as shown in FIG. 7. Now, assuming that the maximum height of the crossing line 14 is set to $H_{max}$ and the minimum height of the crossing line 14 is set to $H_{min}$ and the depth of the reference surface read in the processing information reading step (step S2) is set to (D), the processing range $R_h$ in the height direction can be obtained by the following equation. The reference surface depth D denotes the minimum depth necessary for the reference surface 10.

$$R_h=|H_{max}-H_{min}|+D$$

When the step (step S4) is finished, the CPU 1 automatically calculates the number (N) of times of cutting and a cutting height $H_c$ (step S5).

The step (step S5) of automatically calculating the number (N) of times of cutting and the cutting height $H_c$ will be described in detail hereinbelow.

Figure 8:
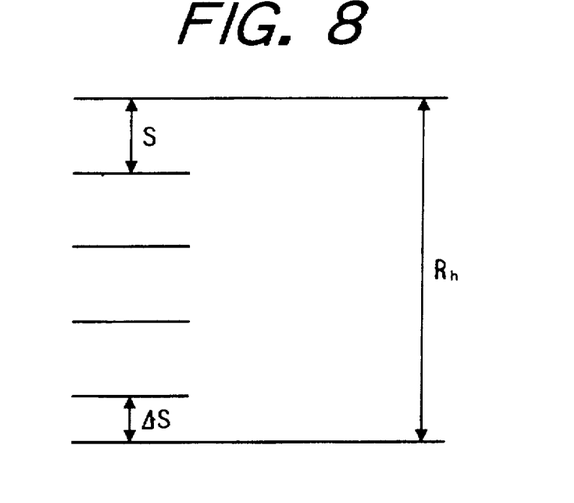
FIG. 8 is a diagram for explaining a calculation of the number of times of cutting.

First, as shown in FIG. 8, when a cutting amount of the tool is set to (S), the number (N) of times of cutting can be obtained by the following equation.

$$N=R_h/S$$

When a remainder ΔS is equal to an allowable error or more, the number of times of cutting is increased by one. The cutting amount (S) of the tool is referred to in the processing information reading step (step S2).

The cutting height $H_c$ can be obtained by the following equation.

$$H_c=|H_{max}-H_{min}|+N\times S$$

When there is a remainder, the last cutting time can be obtained by the following equation.

$$H_c=|H_{max}-H_{min}|+D$$

After finishing the step (step S5), the CPU 1 automatically determines a trace of the tool to be moved (step S6).

Figure 9:
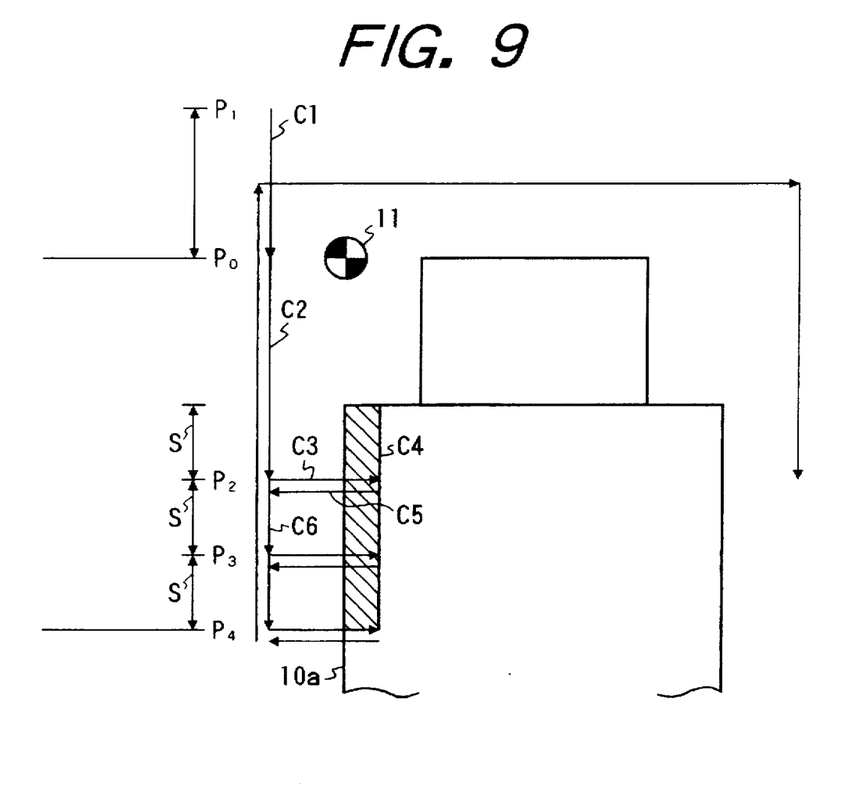
FIG. 9 is a diagram showing a state of an automatic calculation of a trace of a tool in the height direction.

The step (step S6) of automatically determining the trace of the tool to be moved will now be described with reference to FIGS. 9 to 11. FIG. 9 is a diagram showing a state of automatically determining a trace of the tool to be moved in the height direction. FIG. 10 is a diagram showing a state of automatically determining a trace of the tool to be moved in the width direction when the whole reference surface 10 is processed. FIG. 11 is a diagram showing a state of automatically determining a trace of the tool to be moved in the width direction when both ends of the reference surface 10 are processed. In the step (step S6) of automatically determining the trace of the tool to be moved, while judging whether both-ends processing or the whole surface processing of the reference surface 10 is performed (step S7), the trace of the tool to be moved is automatically determined.

In the step (step S6) of automatically determining the trace of the tool to be moved, as shown in FIG. 9, the trace of the tool to be moved in a manner such that the tool is dropped from a tool drop point $P_1$ to an origin position $P_0$ (C1) and to a first cutting height $P_2$ (C2) is determined. In case of the second reference surface 10b or the second cutting time of both-end processing, the tool is dropped only from a position higher than the origin position $P_0$ by an amount corresponding to the movement height to the first cutting height $P_2$.

As shown in FIG. 10, the trace of the tool to be moved is determined in a manner such that the tool approaches the first reference surface 10a (C3) and cuts the reference surface 10a (C4) and, after that, the tool escapes from the reference surface 10a (C5) and is moved to a next cutting height $P_3$ (refer to FIGS. 9 and 10) (C6). The above operation is repeated until the trace of the tool to be moved with respect to a final cutting height $P_4$ is determined.

In the approach (C3) to the reference surface 10a, the tool is moved in a direction of approaching the reference surface 10a by a distance corresponding to (reference surface margin+approach amount+tool diameter/2).

In the cutting (C4) of the reference surface 10a, the tool is moved in the cutting direction of the tool by a distance corresponding to (processing range $R_W$ in the width direction+approach amount×2) when the whole reference surface 10a is processed and the tool is moved by a distance corresponding to {(processing range $R_W$ in the width direction–both-ends reference surface width)/2+approach amount} when both ends of the reference surface 10a are processed. "The cutting direction of the tool" denotes a direction when the process is executed so as to have a cutting object on the right-hand side.

In the escape (C5) from the reference surface 10a, the tool is moved by a distance corresponding to (reference surface margin+approach amount+tool diameter/2) in the direction of escaping from the reference surface 10a.

In the movement (C6) to the next cutting height, when the whole reference surface 10a is processed, the tool is moved in the direction opposite to the cutting direction of the tool by a distance corresponding to (processing range $R_W$ in the width direction+approach amount×2). When both ends of the reference surface 10a are processed, the tool is moved in the direction opposite to the cutting direction of the tool by a distance corresponding to {(processing range $R_W$ in the width direction–width of both ends of the reference surface) /2+approach amount}.

When the step (step S6) is finished, whether both ends or the whole surface of the reference surface 10 is processed is judged. When it is judged that both ends are processed, the processing routine is returned to step S6 and a trace of the tool to be moved between the reference surfaces (C7) is formed as shown in FIG. 11.

In the movement of the tool between the reference surfaces (C7), the tool is moved in the cutting direction of the tool by a distance corresponding to the width of the reference surface. In the movement of the tool in the height direction, the tool is moved to a position higher than the origin position $P_0$ by a distance corresponding to the movement height.

When it is judged that the whole surface is processed, whether two reference surfaces have been processed or not is judged (step S8). If it is judged to be "unprocessed", the processing routine is returned to step S6 and as shown in FIG. 10, in order to determine a trace of the tool to be moved for the other reference surface 10b, a trace (C8) of the tool to be moved from the first reference surface 10a to the second reference surface 10b is determined. After that, the automatic determining step (step S6) of the trace of the tool to be moved is repeated with respect to the second reference surface 10b.

In the movement (C8) from the first reference surface 10a to the second reference surface 10b, the tool is moved in the approaching direction to the first reference surface 10a by a distance corresponding to (reference surface margin+tool diameter/2+approach amount×2+processing range $R_W$ in the width direction of the second reference surface 10b) and the tool is moved in the direction opposite to the cutting direction of the tool of the first reference surface 10a by a distance corresponding to (reference surface margin+tool diameter/2+approach amount×2+processing range $R_W$ in the width direction of the first reference surface 10a).

When it is judged that the processes about two reference surfaces 10 of the first and second reference surfaces 10a and 10b have been finished in step S8, the processing routine is finished.

The data of the trace of the tool to be moved which was formed as mentioned above is stored into the memory device 4 by the CPU 1.

According to the embodiment as mentioned above, since the reference surface position of the read electrode drawing is automatically recognized and the trace of the tool to be moved is automatically determined on the basis of the reference surface position, complete automation in the determination of the trace of the tool to be moved in case of processing the reference surface of the electrode can be realized, the time and exertions required for a manual determination can be reduced, and a variation in the quality of the traces of the tool to be moved due to a difference of the capabilities of the human beings can be eliminated.

According to the invention as mentioned in detail above, since the reference surface position is automatically recognized and the trace of the tool to be moved is automatically determined on the basis of the reference surface position, the operation to decide the trace of the tool to be moved, which is used for processing the reference surface of a solid such as an electrode, can be automated in a numerical controlled discharge machine tool.

What is claimed is:

1. An apparatus comprising:
   reading means for reading figure information from a drawing of a solid;
   origin position setting means for setting an origin position on the basis of the figure information read by said reading means;
   recognizing means for recognizing a position of a reference surface of the solid;
   processing range setting means for setting a processing range on the basis of the origin position set by said origin position setting means, the figure information, and the position of the reference surface recognized by said recognizing means; and
   trace determining means for determining a trace of a tool to be moved on the basis of the processing range set by said processing range setting means and information regarding the process, wherein said recognizing means recognizes the position of the reference surface of the solid on the basis of an attribute of the origin position obtained from a figure of an outer periphery of the solid.

2. An apparatus according to claim 1, wherein said solid is an electrode.

3. An apparatus according to claim 1, wherein the drawing of said solid is formed by Computer Aided Design.

4. An apparatus according to claim 1, wherein the figure information includes an origin position mark of the drawing.

5. An apparatus according to claim 1, wherein the information regarding the process includes a cutting amount of the tool.

6. An apparatus according to claim 1, further comprising calculating means for calculating the number of times of cutting on the basis of the processing range set by the processing range setting means and the information regarding the process.

7. An apparatus according to claim 1, wherein the attribute of the origin position denotes a relative positional relation in a boundary rectangle based on the figure of the outer periphery of the solid.

8. An apparatus according to claim 7, wherein the attribute of the origin position is determined from the origin position, four vertexes of the boundary rectangle, and a position of a crossing point of diagonal lines of the boundary rectangle.

9. A method comprising:

a reading step of reading figure information from a drawing of a solid;

an origin position setting step of setting an origin position on the basis of the figure information read in said reading step;

a recognizing step of recognizing a position of a reference surface of the solid;

a processing range setting step of setting a processing range on the basis of the origin position set in said origin position setting step, the figure information, and the position of the reference surface recognized in said recognizing step; and a trace determining step of determining a trace of a tool to be moved on the basis of the processing range set in said processing range setting step and information regarding the process, wherein in said recognizing step, the position of the reference surface of the solid is recognized on the basis of an attribute of the origin position obtained from a figure of an outer periphery of the solid.

10. A method according to claim 9, wherein said solid is an electrode.

11. A method according to claim 9, wherein the drawing of said solid is formed by computer aided design.

12. A method according to claim 9, wherein the figure information includes an origin position mark of the drawing.

13. A method according to claim 9, wherein the information regarding the process includes a cutting amount of the tool.

14. A method according to claim 9, further having a calculating step of calculating the number of times of cutting on the basis of the processing range set in the processing range setting step and the information regarding the process.

15. A method according to claim 9, wherein the attribute of the origin position denotes a relative positional relation in a boundary rectangle based on the figure of the outer periphery of the solid.

16. A method according to claim 15, wherein the attribute of the origin position is obtained from the origin position, four vertexes of the boundary rectangle, and a position of a crossing point of diagonal lines of the boundary rectangle.

* * * * *

UNITED STATES PATENT AND TRADEMARK OFFICE
CERTIFICATE OF CORRECTION

PATENT NO. : 5,768,136

DATED : June 16, 1998

INVENTOR(S) : Fujiwara et al.

It is certified that error appears in the above-identified patent and that said Letters Patent is hereby corrected as shown below:

On the title page, item:

[30] FOREIGN APPLICATION PRIORITY DATA:

Insert: --[30] Foreign Application Priority Data
Apr. 11, 1995  [JP]  Japan ................. 7-110189--.

Signed and Sealed this

Twenty-third Day of March, 1999

Attest:

Q. TODD DICKINSON

Attesting Officer

Acting Commissioner of Patents and Trademarks